United States Patent [19]
Fukao et al.

[11] Patent Number: 5,323,311
[45] Date of Patent: Jun. 21, 1994

[54] CLASSIFIED-BY-FIELD DICTIONARY GENERATING APPARATUS, MACHINE TRANSLATION APPARATUS AND MACHINE TRANSLATION SYSTEM USING THESE APPARATUSES

[75] Inventors: Itaru Fukao; Hiroaki Abe, both of Kawasaki, Japan

[73] Assignee: Fujitsu Limited, Kawasaki, Japan

[21] Appl. No.: 754,452

[22] Filed: Sep. 3, 1991

[30] Foreign Application Priority Data

Aug. 31, 1990 [JP] Japan .................. 2-228434

[51] Int. Cl.⁵ .......................................... G06F 15/38
[52] U.S. Cl. .............................................. 364/419.02
[58] Field of Search .............. 364/419, 419.02, 419.04, 364/419.11, 419.14, 419.16

[56] References Cited

U.S. PATENT DOCUMENTS

| | | | |
|---|---|---|---|
| 4,615,002 | 9/1986 | Innes | 364/419.02 |
| 4,731,735 | 3/1988 | Borgendale et al. | 364/419.16 |
| 4,870,610 | 9/1989 | Belfer | 364/419.02 |
| 5,132,901 | 7/1992 | Yokogawa | 364/419.02 |
| 5,201,042 | 4/1993 | Weisner et al. | 364/419.02 |

FOREIGN PATENT DOCUMENTS

| | | |
|---|---|---|
| 0388148 | 9/1990 | European Pat. Off. . |
| 61-278987 | 12/1986 | Japan . |
| 2-36419 | 2/1990 | Japan . |
| WO89/02131 | 3/1989 | PCT Int'l Appl. . |

OTHER PUBLICATIONS

"Language Translation of Code," T. N. Brown, IBM Technical Disclosure Bulletin, vol. 17, No. 6, Nov. 1974, Armonk US, pp. 1763-1764.

"Automated Translation," J. W. Moran et al., IBM Technical Disclosure Bulletin, vol. 17, No. 7, Dec. 1974, Armonk US, pp. 2073-2076.

Primary Examiner—Robert A. Weinhardt
Attorney, Agent, or Firm—Staas & Halsey

[57] ABSTRACT

A machine translation apparatus for automatically generating a classified-by-field dictionary to be used for translating a pseudo code program into a program in a plurality of other languages based on a design document described in notation data used to describe a design document which produces a pseudo code program in which names are defined by at least two languages; and for automatically translating a pseudo code program described in a language into a pseudo code program described in another language.

20 Claims, 9 Drawing Sheets

FIG. 5B  FROM FIG. 5A

```
┌─────────────────────────────────────────────────────────────────┐
│ [==]                           ║║ YPS EDITOR ║║                 │
│                          STARTING LINE OF PICTURE SCREEN: 0061400│
├─────────────────────────────────────────────────────────────────┤
```

— ☆MODULE ARRANGEMENT DIAGRAM
  JAPANESE NAME DECLARATION

— INITIALIZATION PROCESSING : SVDC001 ENGLISH CAPITAL LETTER
  DECLARE ... AS JAPANESE NAME

— DISC COMMAND ISSUE PROCESSING : SVDC002 ENGLISH CAPITAL LETTER
  DECLARE ... AS JAPANESE NAME

— ACTIVATING FACTOR : SVDFANL ENGLISH CAPITAL LETTER
  ANALYZING PROCESSING DECLARE ... AS JAPANESE NAME

— (MESSAGE OWN TASK ISSUE PROCESSING : SVDC003 ENGLISH CAPITAL LETTER
  DECLARE ... AS JAPANESE NAME

— MS CURRENT CHECK PROCESSING : MSCCURR ENGLISH CAPITAL LETTER
  DECLARE ... AS JAPANESE NAME

— LINE OUT AND RETRANSMISSION PROCESSING : SVDDISC ENGLISH CAPITAL LETTER
  DECLARE ... AS JAPANESE NAME

— CONNECTION COMPLETION/ABNORMAL : SVDC004 ENGLISH CAPITAL LETTER
  INFORMING PROCESSING DECLARE ... AS JAPANESE NAME

— SNRN COMMAND ISSUE PROCESSING : SVDC006 ENGLISH CAPITAL LETTER
  DECLARE ... AS JAPANESE NAME

— (DATA CLASSIFICATION ANALYZING PROCESSING) : SVDFDAT ENGLISH CAPITAL LETTER
  DECLARE ... AS JAPANESE NAME

— SUPERVISORY DEVICE CONTROL TASK MAIN : SVDMAIN ENGLISH CAPITAL LETTER
  DECLARE ... AS JAPANESE NAME

[END]

— ☆COMMON ROUTINE JAPANESE NAME
  DECLARATION

— U FRAME GENERATION PROCESSING : SVDMU ENGLISH CAPITAL LETTER
  DECLARE ... AS JAPANESE NAME

— t FRAME GENERATION PROCESSING : SVDMI ENGLISH CAPITAL LETTER
  DECLARE ... AS JAPANESE NAME

— S FRAME GENERATION PROCESSING : SVDMS ENGLISH CAPITAL LETTER
  DECLARE ... AS JAPANESE NAME
  □
  □

[EXTRACTION]

: XXXXXXX ENGLISH CAPITAL LETTER
— ☆JAPANESE NAME DECLARE ... AS JAPANESE NAME

: SMMSGND ENGLISH CAPITAL LETTER
— M MESSAGE HEADER DECLARE ... AS JAPANESE NAME

: SMMSGPR ENGLISH CAPITAL LETTER
— M MESSAGE PRIORITY DECLARE ... AS JAPANESE NAME

DELETE SENTENCE : DESIGNATE DELETE RANGE        ENGLISH CAPITAL LETTER

GRAPHIC SYMBOL DATA OF MODULE

GRAPHIC SYMBOL DATA OF
COMMON ROUTINE

GRAPHIC SYMBOL DATA OF
DIVERTED ROUTINE

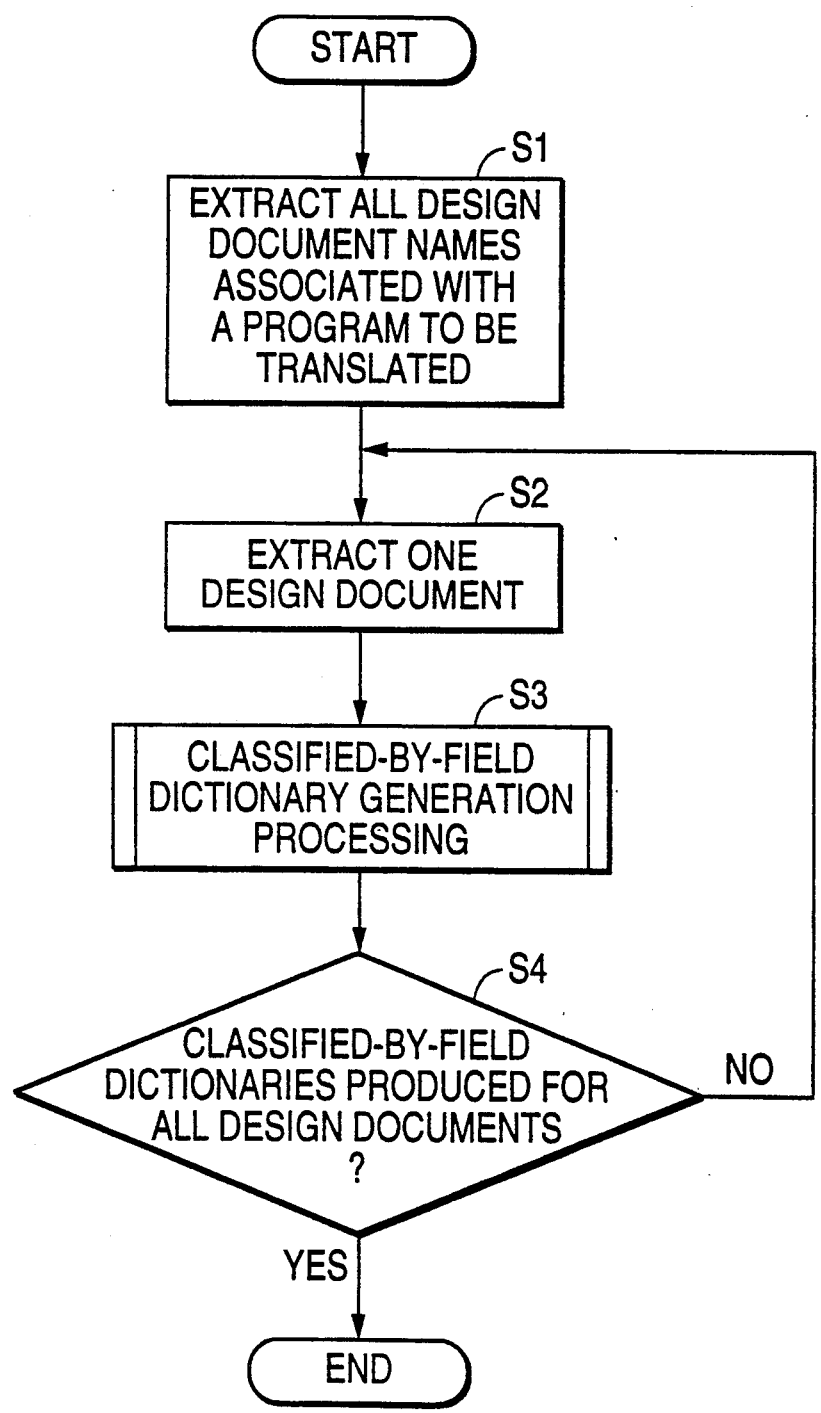

CLASSIFIED-BY-FIELD DICTIONARY GENERATING APPARATUS, MACHINE TRANSLATION APPARATUS AND MACHINE TRANSLATION SYSTEM USING THESE APPARATUSES

FIELD OF THE INVENTION

The present invention relates to machine translation and, more particularly, is directed to a multilingual machine translation system for programs to translate a pseudo code program written in an arbitrary language into a pseudo code program written in another language.

DESCRIPTION OF THE PRIOR ART

Recently, a kind of compiler has been realized to convert a pseudo code program written as a structured chart expression in the Japanese language into a code that computers can execute, thus enabling Japanese people to make a program with ease. The above pseudo code program is substantially similar to the detailed design document level and, therefore, has the advantage that, it requires little labor to develop. The program development period is much less than when a program is made by means of program languages, such as FORTRAN, C, COBOL or the like.

Recently, an increasing number of programs developed in Japan have been utilized overseas. Thus, the description of the program in the Japanese language causes the problem that, when it has to be maintained, users cannot understand the program itself or the Japanese manual, thus making maintenance of the program impossible. This problem is not limited to the Japanese language, but commonly occurs in other countries, for example, when a plurality of countries cooperate in developing a program. Thus, to simplify maintenance of the program, the pseudo code program described in the language of a certain country must be converted into a program described in the language of other countries. Machine translation systems have been proposed to automatically translate a sentence in one language to a sentence in another language (e.g., the Japanese and the English languages). For these machine translation systems, dictionaries for the required fields must be prepared both languages.

However, the language described in the above pseudo code program is an artificial language, so, the syntaxes can be easily made coincident. However, most of the words expressing the word to be programmed, i.e. most names of variables and constants, are separately prepared for individual programs.

However, the names of variables and constants in pseudo code programs exported overseas are frequently described in the form of a list table on the design document in a plurality of languages.

SUMMARY OF THE INVENTION

The present invention is intended to generate a bilingual dictionary with respect to words such as variables, constants and the like, utilized in the pseudo code program from the design document and to automatically translate a pseudo code program described in a language of a certain country into a pseudo code program described in a language of another country by using the above bilingual dictionary.

A feature of the present invention resides in a classified-by-field dictionary generating apparatus comprising: notation data memory means for storing notation data used to describe a design document which produces a pseudo code program in which names are defined by at least two languages; extracting means supplied with a design document described by said notation data and extracting bilingual information necessary for translating a pseudo code program of a predetermined field described in a certain language into a pseudo code program described in another language on the basis of said notation data stored in said notation data memory means and dictionary generating means for generating a classified-by-field dictionary corresponding to a field of a pseudo code program to be translated in which translation information on all notation data described in said input design document is written in a predetermined format on the basis of said bilingual information extracted by said extracting means.

BRIEF DESCRIPTION OF THE DRAWINGS

FIGS. 5A and 5B are schematic diagrams used to explain the operation of an embodiment of the present invention;

FIG. 7 is a flowchart to which references will be made in explaining the process of a machine translation apparatus.

DESCRIPTION OF THE PREFERRED EMBODIMENT

Figure 1:
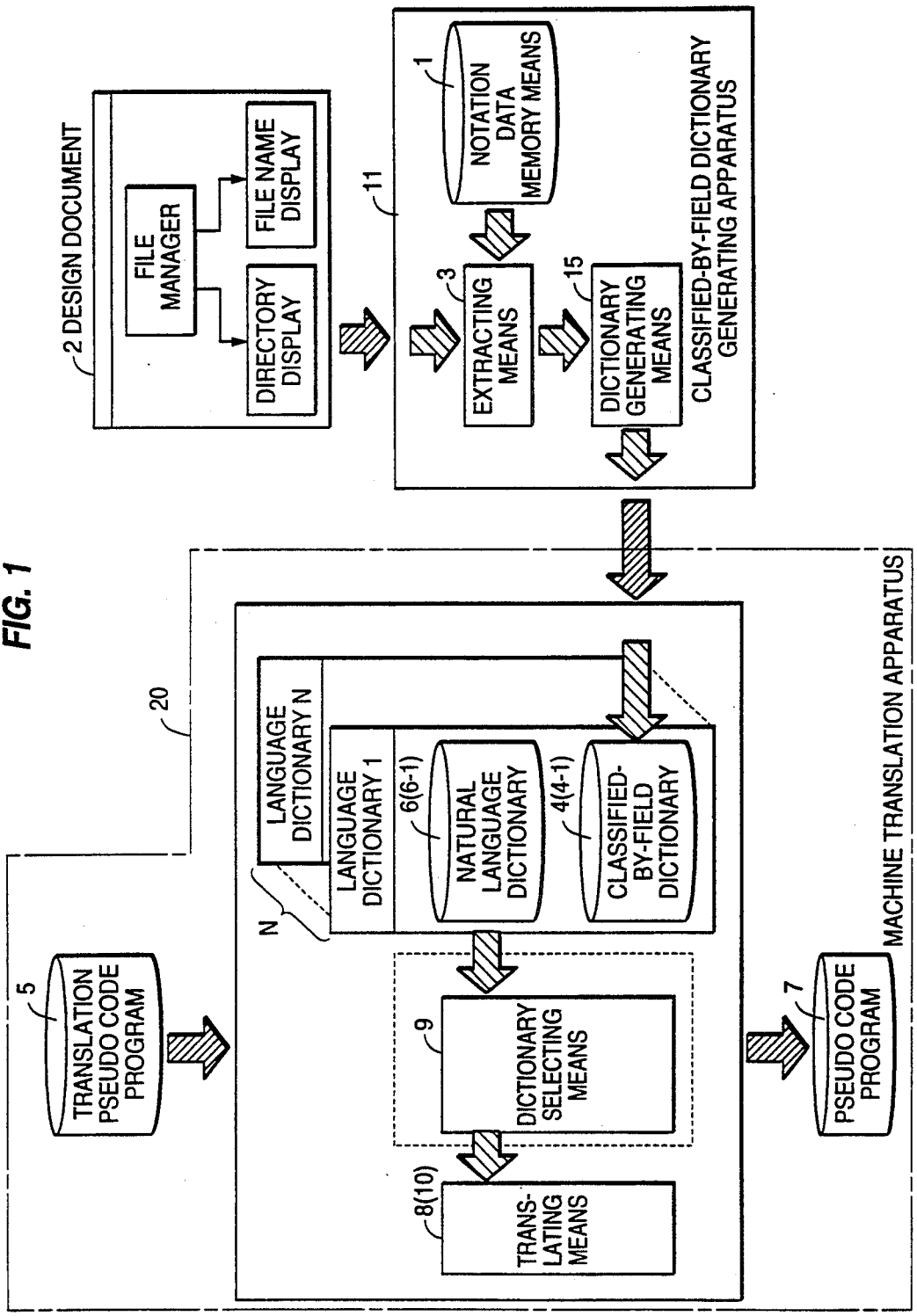
FIG. 1 is a block diagram for explaining the principle of the present invention.

FIGS. 1 block diagrams used to explain the principle of the present invention.

A classified-by-field dictionary generating apparatus 11 shown in FIG. 1 is constructed as follows.

A notation data memory means 1 is adapted to store notation data used to describe a design document for making a pseudo code program in which names of variables, constants, etc., are defined in at least two languages. This notation data memory means 1 is composed of, for example, a DASD (Direct Access Storage Device).

An extracting means 3 is supplied with a design document 2 described in the above notation data and utilizes the notation data stored in the above notation data memory means 1 to extract bilingual information which is required to translate a pseudo code program of a predetermined field written in a certain language into a pseudo code program of another language. The extracting means 3 is formed of, for example, a CPU (Central Processing Unit).

A dictionary generating means 15 is adapted to generate, on the basis of the bilingual information extracted by the extracting means 3, a classified-by-field dictionary corresponding to the field of the pseudo code program to be translated in which translation information of all notation data described in the above input design document 2 are described in the predetermined format. The dictionary generating means 15 is formed of, for example, a CPU.

The design document 2 is made, for example, by a display editor, and the notation data thereof is composed of a graphic symbol and data presented in the form of a table. The design document may, for example, include a file manager, a directory display, and a file name display.

The machine translation apparatus 20 shown in FIG. 1 is constructed as follows.

The classified-by-field dictionary 4 is employed as a bilingual dictionary of all notation data which describes the design document 2 generated by the above classified by-field dictionary generating apparatus 11 and made, for example, in the DASD, as a file.

A natural language dictionary 6 is employed to translate a natural language expressing the translation pseudo code program 5 to be translated into another natural language and is made, for example, in the DASD, as a file. This natural language dictionary 6 is a dictionary for translating original sentences in one language into sentences in another language. Examples are an English-Japanese dictionary and a Japanese-English dictionary.

A translation dictionary 8 is employed for translating the above translation pseudo code program 5 described in one language into a pseudo code program described in another language with reference to the above classified-by-field dictionary 4 and the above natural language dictionary 6. The translation dictionary 8 is formed of, for example, a CPU.

The machine translation apparatus 20 shown in FIG. 1 is constructed as follows.

Classified-by-field dictionaries 4-1 through 4-N are prepared for a plurality of natural languages.

Natural language dictionaries 6-1 through 6-N are prepared as for the classified-by-field dictionaries 4-1 to 4-N in a one-to-one relation.

The above classified-by-field dictionaries 4-1 to 4-N and natural language dictionaries 6-1 to 6-N are formed, for example, within the DASD as files.

A dictionary selecting means 9 is employed for selecting the classified-by-field dictionary (4-I; I=1, 2, ... N) and the above natural language dictionary (6-I; I=1, 2, ..., N) corresponding to the language expressing the translation pseudo code program 5 to be translated from the plurality of classified-by-field dictionaries 4-1 through 4-N and the plurality of natural language dictionaries 6-1 through 6-N. The dictionary selecting means 9 is formed of, for example, a CPU.

A translating means 10 is employed for translating the translation pseudo code program 5 into the pseudo code program 7 described in another desired language, with reference to the above classified-by-field dictionary 4-I (I=1,2, ..., N) and the above natural language dictionary 6-I (I=1,2, ..., N) selected by the above dictionary selecting means 9. The translating means 10 is formed of, for example, a CPU.

The machine translation system has a configuration in which, for example, the classified-by-field dictionary generating apparatus 11 and machine translation apparatus 20 are connected to a network such as a local, wide area, metropolitan, or in-house network.

The classified-by-field dictionary generating apparatus 11 and the machine translation apparatus 20 are connected in the same network. The machine translation apparatus 20 receives the classified-by-field dictionary 4 from the classified-by-field dictionary generating apparatus 11 through the network and translates the translation pseudo code program 5 described in a certain language into the pseudo code program 7 described in another desired language with reference to the thus received classified-by-field dictionary 4 and the natural language dictionary 6 prepared therein.

When the network is a local area network, the above described classified-by-field dictionary generating system is provided in a server node, for example, and the machine translation apparatus is provided in a client node, for example.

As another appropriate implementation, the classified-by-field dictionary generating apparatus 11 and the machine translation apparatus 20 are provided for a specific computer in the network, and the specific computer receives a translation pseudo code program from another computer or terminal in the network through a circuit of the network, converts the received translation pseudo code program to a pseudo code program described in a language specified by the above described computer or terminal, and transmits the converted pseudo code program to the computer or terminal through a circuit of the network.

When the network is a local area network, for example, the above described specific computer is a server node.

The action of the present invention is as follows.

The classified-by-field dictionary generating apparatus 11 is supplied with the design document 2 made from the predetermined notation data. It extracts all notation data described in the inputted design document 2 with reference to the notation data stored in the notation data memory means 1 and in which names are defined by at least two languages, thereby extracting the bilingual information necessary for translating the pseudo code program of the predetermined field described in a certain language (e.g., the Japanese language) into a pseudo code program of another language (e.g., the English language). The dictionary generating means 15 generates, on the basis of the thus extracted bilingual information, the classified-by-field dictionary 4 in which the translation information of all notation data described in the input design document 2 are described in the predetermined format.

Thus, the classified-by-field dictionary 4 is generated, by which the arbitrary translation pseudo code program 5 can be translated into many languages in a two-way fashion.

Then, in the machine translation apparatus 20 the translating means 8 translates the translation pseudo code program described in one language into the pseudo code program described in another language on the basis of the classified-by-field dictionary 4 generated by the above classified-by-field dictionary generating apparatus 11 and the natural language dictionary 6 for the former language.

Therefore, the translation pseudo code program 5 can be translated into pseudo code programs of arbitrary languages in a two-way fashion.

Further, in the machine translation apparatus 20 of the dictionary selecting means 9 selects the classified-by-field dictionary 4-I (I=1, 2, ..., N) of the field corresponding to the translation pseudo code program 5 and the natural language dictionary 6-I corresponding to the natural language expressing the translation pseudo code program 5 from the plurality of classified-by-field dictionaries 4-1 to 4-N and the plurality of natural language dictionaries 6-1 through 6-N. Then, the translating means 10 translates the above translation pseudo code program 5 into the pseudo code program 7 described in the other desired language with reference to the thus selected classified-by-field dictionary 4-I and natural language dictionary 6-I.

Therefore, the pseudo code program can be translated into other pseudo code programs of many languages in a two-way fashion.

In the machine translation system, the classified-by-field dictionary 4 is generated by the classified-by-field dictionary generating apparatus 11 connected in the same network. When translating the translation pseudo code program 5, the machine translation apparatus 20 receives the classified-by-field dictionary 4 from the classified-by-field dictionary generating apparatus 11 and translates the above translation pseudo code program 5 into the pseudo code program 7 described in the other desired language with reference to the thus received classified-by-field dictionary 4 and the natural language dictionary 6 prepared therein.

As described above, since the classified-by-field dictionary 4 and the pseudo code program 7 are generated by the above two apparatuses coupled on the same network 30 in a distributed processing fashion, it becomes possible to perform the machine translation of the pseudo code program by effectively utilizing the resources of the network 30. Embodiments of the present invention will hereinafter be described with reference to the drawings.

Figure 2:
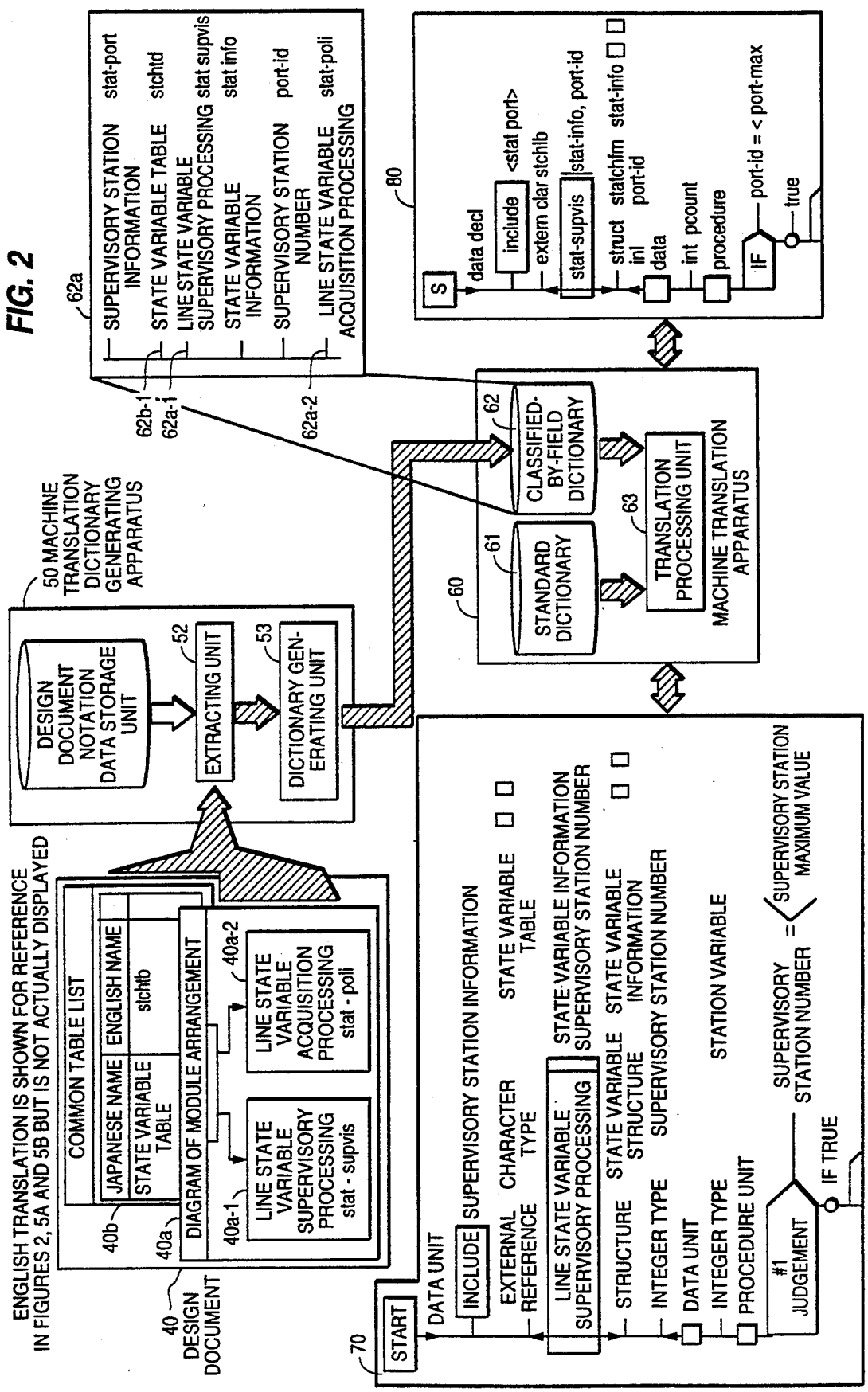
FIG. 2 is a block diagram showing an arrangement of a system according to an embodiment of the present invention.

FIG. 2 is a block diagram of an embodiment of the present invention. It illustrates an arrangement of the system in which a pseudo code program written in the Japanese language and a pseudo code program written in the English language are translated into each other in a two-way fashion.

Figure 3:
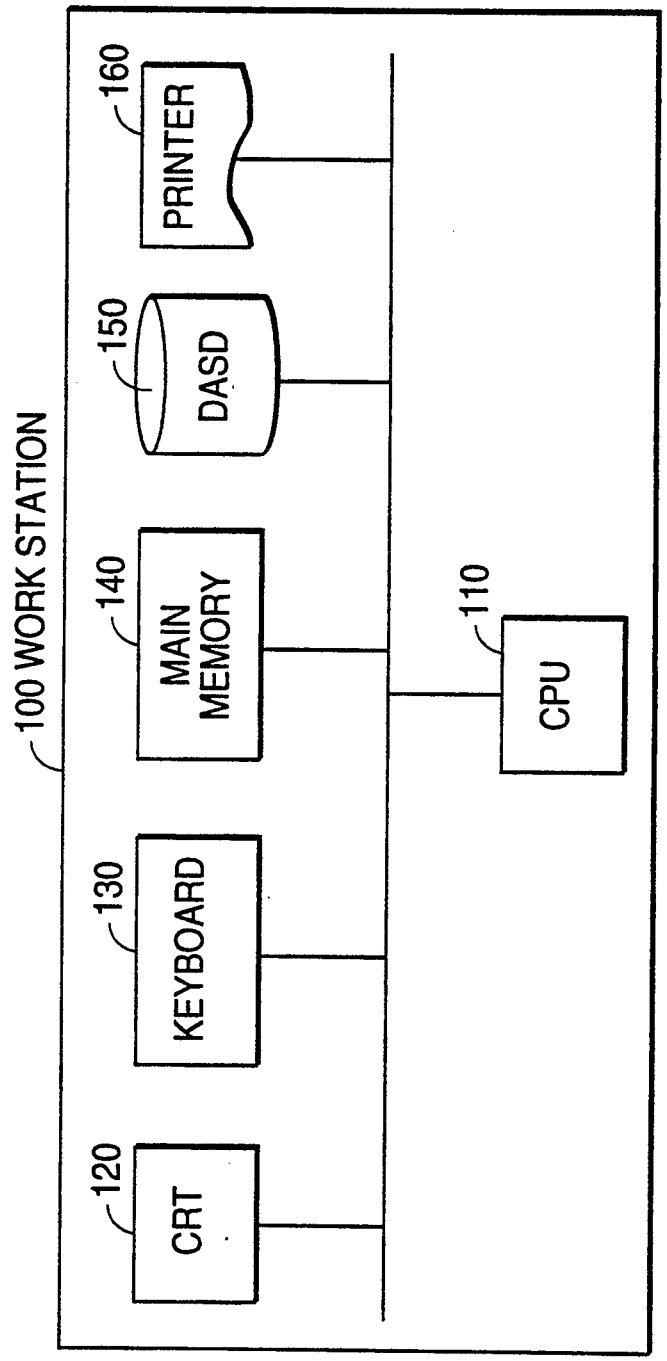
FIG. 3 is a diagram showing an example of a hardware arrangement used in an embodiment of the present invention.

The system shown in FIG. 2 comprises a work station 100 composed of a CPU 110, a DASD (Direct Access Storage Device) 150 formed of a CRT (cathode ray tube) 120, a keyboard 130, a main memory 140 and a magnetic disc and a printer 160 as shown in FIG. 3. Alternatively, as shown in FIG. 4, this system may be comprised of a computer network or the like in which two personal computers 200, each formed of a CPU 210, a CRT 220, a keyboard 230, a main memory 240, a DASD 250 and a printer 260 are coupled together by means of a network line 400 such as a LAN (local area network).

Referring to FIG. 2, a design document 40 is composed of a module arrangement diagram 40a, a common table list 40b, a parameter list prepared for every module, and a macro instruction list or the like, not shown, in which the module arrangement diagram 40a, the common table list 40b, the parameter list for every module and the macro instruction are described in the Japanese language and in an English language expression corresponding to the Japanese language expression. A plurality of design documents 40 are formed, one for each of a plurality of classifications. Then, the pseudo code program is formed from design information described in the plurality of design documents 40.

Figure 4:
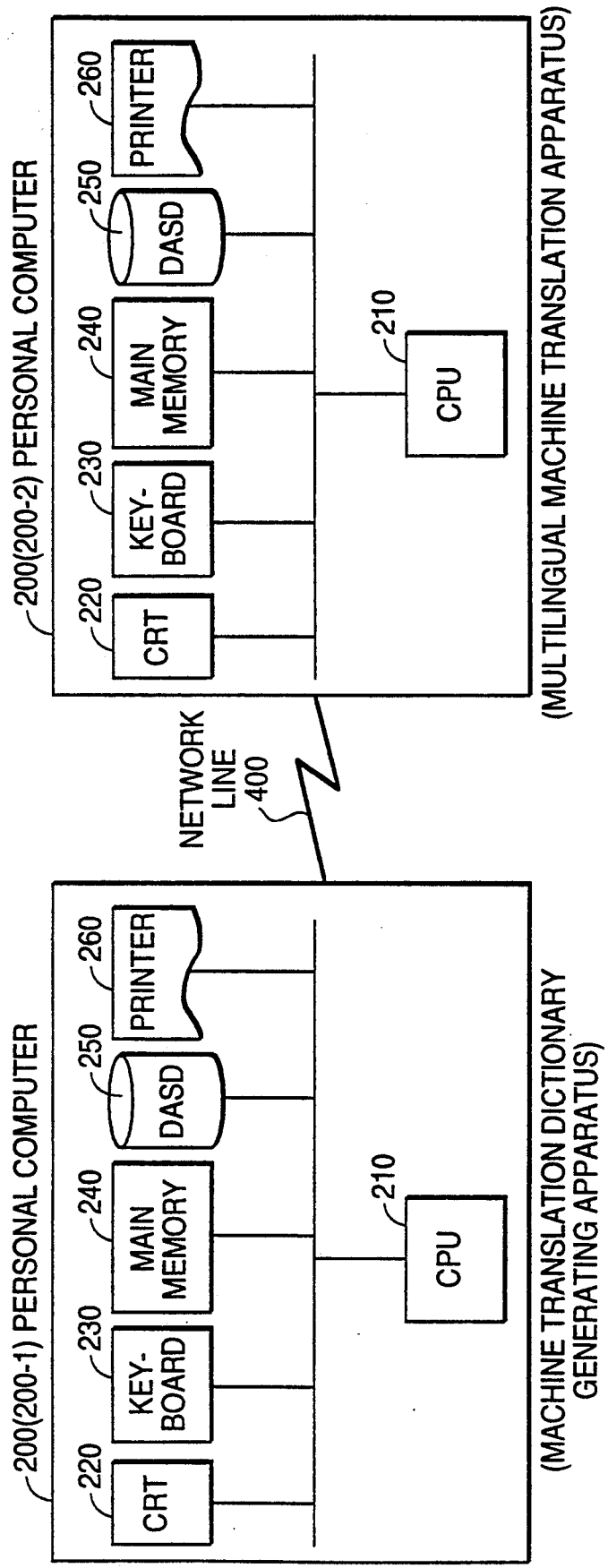
FIG. 4 is a diagram showing another example of a hardware arrangement used in an embodiment of the present invention.

Each design document 40 is stored as a file within the DASD 150 of the work station 100 shown in FIG. 3 and/or within a DASD 250 of a personal computer 200-1, which serves as the machine translation dictionary generating apparatus in the computer network shown in FIG. 4. This design document 40 is made by activating an editor stored in the DASD 150 or 250 by operating the keyboard 130 in the above work station 100 or the keyboard 230 of the personal computer 200-1 in the above computer network.

The machine translation dictionary generating apparatus 50 comprises a design document notation data storage unit 51, an extracting unit 52 and a dictionary generating unit 53. The data storage unit 51 stores graphic symbols or data of a table to be extracted at every field of the design document. The extracting unit 52 extracts description data about the module name, the common table name or the like from the above design document 40 on the basis of the graphic symbol and table data stored in the design document notation data storage unit 51. The dictionary generating unit 53 generates a classified-by-field dictionary 61 used to perform the original translation of the Japanese language and the English language on the basis of the information extracted in a two-way fashion by the extracting unit 52.

The design document data storage unit 51 is stored in the DASD 150 in the work station 100 shown in FIG. 3 or in the DASD 250 of the personal computer 200-1 of the personal computer shown in FIG. 4. The functions of the extracting unit 52 and the dictionary generating unit 53 are executed by the execution of the CPU 110 in the work station 100 shown in FIG. 3 or by the execution of the CPU 210 of the personal computer 200-1 in the computer network shown in FIG. 4.

The machine translation apparatus 60 is composed of a standard dictionary (natural language dictionary) 61, a classified-by-field dictionary 62 and a translation processing unit 63. The standard dictionary 62 is used to translate general sentences in a machine translation fashion. The classified-by-field dictionary 62 is generated by the dictionary generating unit 53 of the above machine translation dictionary generating apparatus 50. The translation processing unit 63 converts and makes a pseudo code program 70 described in the Japanese language and a pseudo code program 80 described in the English language in a two-way fashion with reference to the standard dictionary 61 and the classified-by-field dictionary 62.

In the work station 100 shown in FIG. 3, the standard dictionary 61 and the classified-by-field dictionary 62 are generated in the DASD 150 as the files and the function of the translation processing unit 63 is realized by the execution of the CPU 110.

Further, in the computer network shown in FIG. 4, the standard dictionary 61 and the classified-by-field dictionary 62 are generated within the DASD 250 of the personal computer 200-2 as the files and the function of the translation processing unit 63 are realized by the execution of the CPU 210 of the personal computer 200-2.

The pseudo code program 70 and the pseudo code program 80 are pseudo code programs expressed in the form of structured charts in the Japanese language and the English language, respectively. The pseudo code program 70 (hereinafter referred to as a Japanese language program 70) and the pseudo code program 80 (hereinafter referred to as an English language program 80) are translated to each other in a two-way fashion by the machine translation apparatus 60.

Reference numeral 62a shown in FIG. 2 shows a part of the classified-by-field dictionary 62. In this part, the machine translation dictionary generating apparatus 50 generates bilingual information 62a-1 and 62a-2 of "line state variable supervisory processing to stat-supvis" and "line state variable acquisition processing to stat-poli" from the description of a module 40a-1 connected to the module arrangement diagram 40a of the design document 40. Also "line state variable supervisory processing" in the Japanese language and "stat-supvis" in the English language are presented, and a module 40a-2 in which "line state variable acquisition processing" in the Japanese language and "stat-poli" in the English language are presented. Similarly, bilingual data 62b-1 of "state variable table to stchb" are generated from the common table list 40b of the design document 40 shown in FIG. 2.

Operation of the thus arranged embodiment will be described next.

Figure 5A:
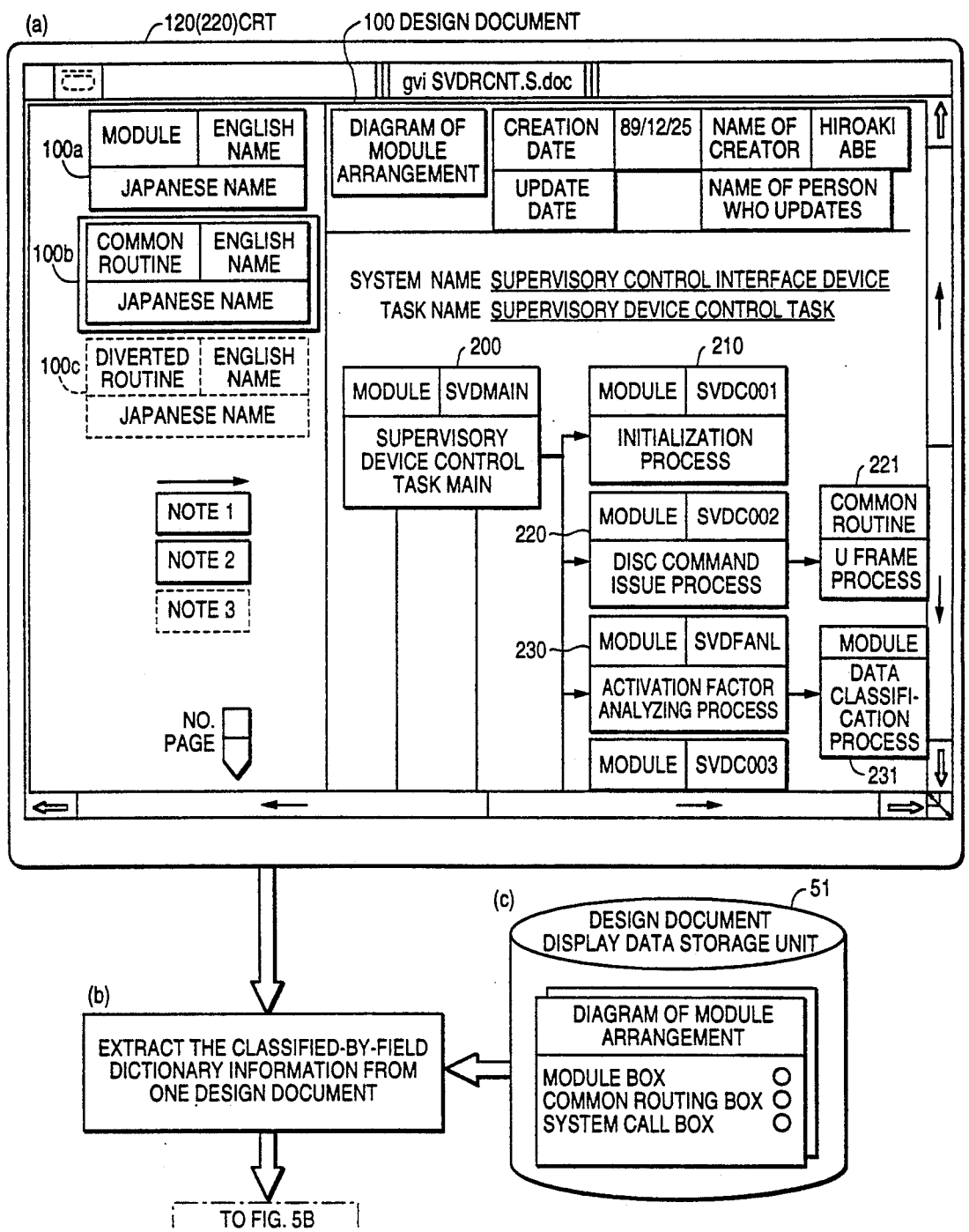

FIG. 5A and FIG. 5B are a schematic diagram used to explain how the classified-by-field dictionary information is extracted by the extracting unit 52 of the machine translation dictionary generating apparatus 50.

Figure 6A:
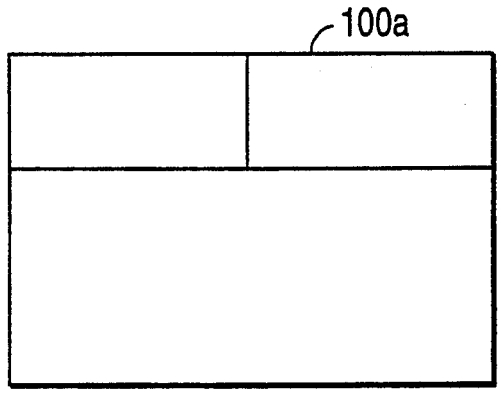
FIG. 6a, FIG. 6b, and FIG. 6c are diagrams showing symbol data used to describe a design document.

A design document notation data storage unit 51 shown in FIG. 5A(c) stores graphic symbol data 100a, 100b and 100c of the module; the common routine; and the diverted routine shown in FIGS. 6(a), (b) and (c) in association with the names thereof.

Initially, the user activates the display editor stored in the DASD 150 (250) by operating the keyboard 130 (230) to make a design diagram of a supervisory device control task of the supervisory control interface apparatus shown in FIG. 5A(a) on the picture screen of the CRT 120 (220).

In the example shown in FIG. 5A(a), a supervisory device control task main module (English name: SVDMAIN) 200 comprises an initialization processing module (English name: SVDC001) 201, a DISC command issue processing module (English name: SVDC002) 202, an activating factor analyzing processing module (English name: SVDFAIL) 230 . . . , etc. Further, the design document 100 is displayed. The DISC command issue processing module 220 includes a U frame generating processing common routine (English name: SVDMU) 221 and the above activating factor analyzing processing module 230 includes a data classification analyzing processing module (English name: SVDFDAT). Incidentally, although the above U frame generation processing common routine 221 and the data classification analyzing routine 231 are not fully displayed in the picture shown in FIG. 5A(a), the whole of the U frame generation processing common routine 221 and the data classification analyzing processing module 231 can be made and checked by horizontal scrolling. Also, another module 100a, a common routine 100b, a system call 100c, etc., forming the supervisory device control task, can be made and referred to by vertical scrolling.

Figure 6B:
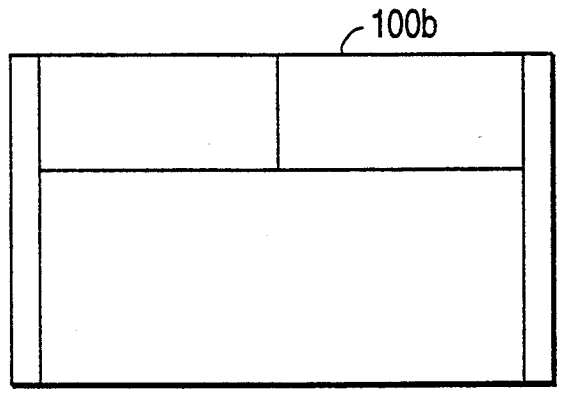
Figure 6C:
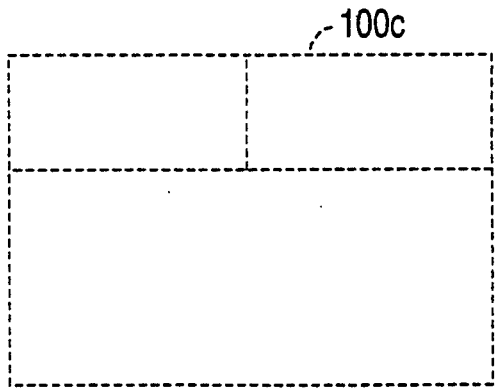

The extracting unit 52 of the machine translation dictionary device 50 extracts all module 100a and common routine 100b from the design drawing 100 of the supervisory device control task of the supervisory control interface device, which is partly shown in FIG. 5A(a), with reference to a module graphic symbol data 100a, common routine graphic symbol data 100b and diversion routine graphic data 100c stored in the design document data storage unit 51 and which are illustrated in FIGS. 6(a), 6(b) and 6(c) thereby to extract classified-by-field dictionary data 301, 302, 303 such as module (initialization processing, DISC command setting processing, activating factor analyzing processing, . . . , supervisory device control task main), common routine (U frame generation processing, one frame generation processing, S frame generation processing), common data name (M message header, M message priority, . . . ) and so on as shown in FIG. 5B(d). On the basis of the thus extracted classified-by-field data 301, 302, and 303 of the design document 100, the dictionary generating unit 53 generates the classified-by-field dictionary 62.

Figure 8:
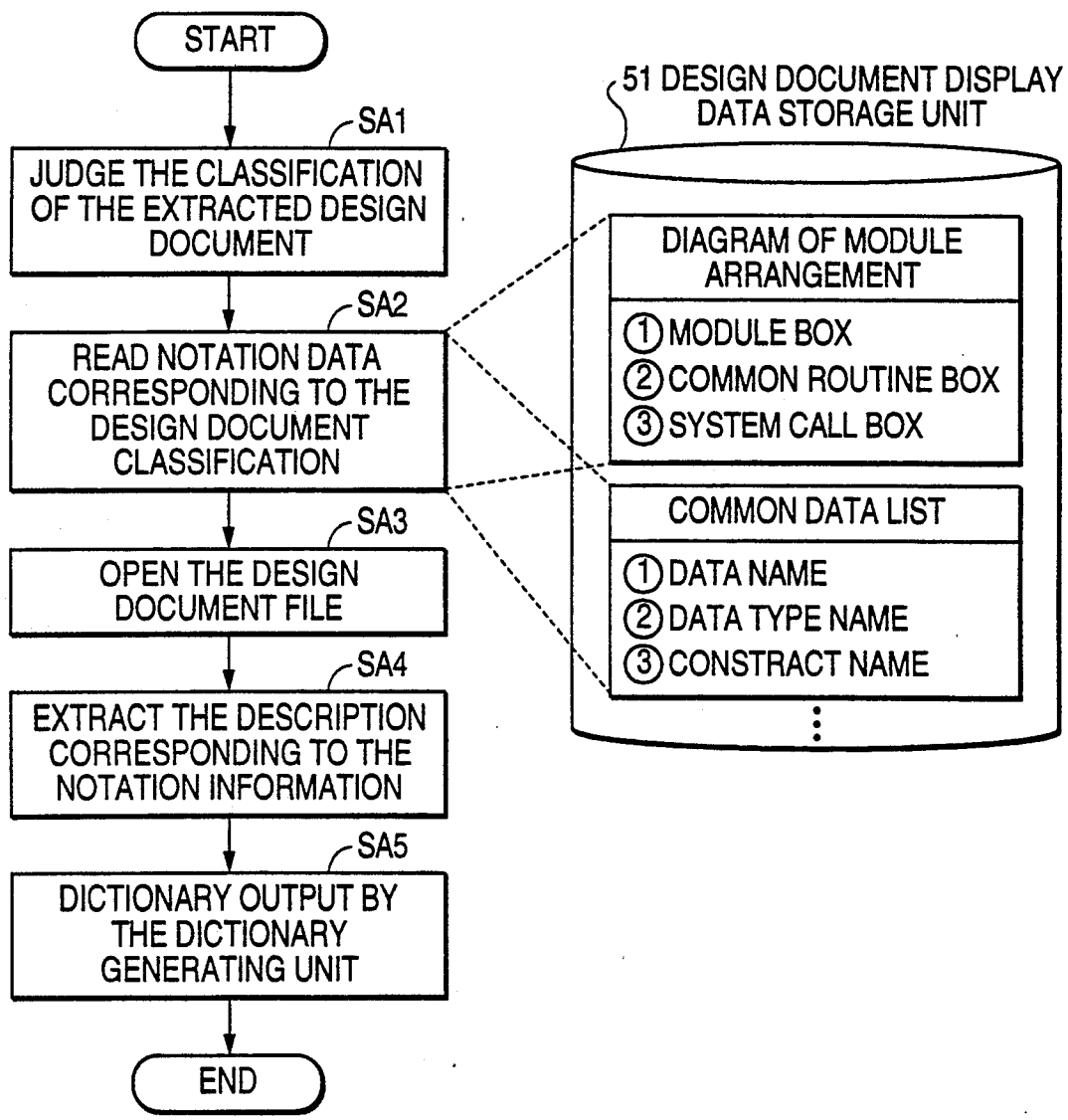
FIG. 8 is a flowchart to which references will be made in explaining more fully the generation of a classified by-field dictionary.

The process of generating the classified-by-field dictionary 62 with the dictionary generating unit 53 of the machine translation dictionary generating device 50 will be described with reference to the flowcharts of FIGS. 7 and 8.

If the user inputs a pseudo code program (hereinafter simply referred to as a program) to be translated by operating the keyboard 130 (230), the extracting unit 22 extracts all design document names associated with the program with reference to the directory associated with the design document 40 formed, for example, within the DASD 150 (250), and writes the extracted file name of the design document 40 in the work area of the main memory 140 (240) (in step S1). Then, the design document classification data (design document classified-by-field data) is also written in the above work area in response to the thus extracted design document name.

Then, the file name of the first design document 40 is extracted from a plurality of file names of the design documents 40 (in step S2) and the file of the design document 40 is read out from the DASD 150 (250). Also, the notation data corresponding to the above design document 40 is read out from the design document data storage unit 51 similarly formed within the DASD 150 (250), and the process (step S3) for compiling the classified-by-field dictionary 62 associated with the design document 40 is executed. After the classified-by-field dictionary 62 associated with the first design document 40 is compiled by the above process S3, it is determined in step S4 whether or not the classified-by-field dictionaries 62 are to be produced for all of the design documents 40. If the classified-by-field dictionary 62 is not to be fully compiled for all of the design documents 40, as represented by a NO at step S4, then the above steps S2 to S4 are repeated for the next design document 40.

If it is determined that the classified-by-field dictionaries 62 are to be compiled for all of the design documents 40 associated with the above program as represented by a YES at step S4, then the processing is ended.

The above process for compiling classified-by-field dictionary will be described more fully with reference to the flowchart in FIG. 8.

Initially, in step SA1 the extracting unit 52 determines the classification of the extracted design document 40 and in step SA2 reads out notation data (module, common routine, system call graphic symbol data, data name, data type name, constant name, etc.) corresponding to the classification of the thus determined design document 40 from the design document notation data of storage unit 51.

Then, in step SA3 the file of the above design document 40 is opened. In step SA4, it is determined whether or not the description data (module, common routine, system call graphic data, data name, data type name, constant name, etc.) of the design document 40 stored within the thus opened file are coincident with the notation data read out in step SA2, and corresponding data of Japanese names and English names with respect to the module, common routine, data name or the like are made as shown in FIG. 5(d).

Furthermore, the dictionary generating unit 53 generates the classified-by-field dictionary 62 in which Japanese names and English names are mapped in a one-to-one fashion with respect to the module, common routine, system call, data name, data type name, constant name or the like as shown in the diagram 62a in FIG. 2 on the basis of the data indicating the corresponding relation of Japanese names and English names with respect to the module, common routine, data name and so on made by the extracting unit 52. Then, in step SA5, the dictionary generating unit 53 makes the file of the thus generated classified-by-field dictionary 62 in the DASD 150 of the work station 100 shown in FIG. 3 or in the DASD 250 of the personal computer 200-2 of the computer network shown in FIG. 4.

The thus generated classified-by-field dictionary 62 is used when the translation processing unit 63 translates the pseudo code program 70 expressed in Japanese into the pseudo code program 80 expressed in English or when the translation processing unit 63 translates the pseudo code program 80 expressed in English into the pseudo code program 70 expressed in Japanese. That is, by utilizing the classified-by-field dictionary 62 generated as described above, the pseudo code program 70 expressed in Japanese and the pseudo code program 80 expressed in English can be translated in a two-way fashion.

While the pseudo code programs expressed in Japanese and in English are translated two-way as described above, the present invention is not limited thereto and pseudo code programs expressed in a plurality of other languages can be translated in a two-way fashion. More specifically, according to the present invention, since selection data such as graphic symbols, table type data and the like for describing the design document are stored beforehand, and one or a plurality of classified-by-field dictionaries for two arbitrary languages are automatically generated from the design document, the pseudo code programs expressed in a plurality of arbitrary languages can be translated in a two-way fashion.

Further, if the design documents and the dictionary (classified-by-field dictionary and standard dictionary) data are transferred between terminals via the network, then the present invention can be realized by using a system in which the above design documents and dictionary data are stored in the respective terminals in a decentralized fashion.

That is, in the configuration where the machine translation dictionary generating apparatus (classified-by-field dictionary generating apparatus) 50 is provided in a server node and the machine translation apparatus 60 is provided in a client node in the local area network, wherein the server node manages the generation of a classified-by-field dictionary while the client node translates a pseudo code program, a classified-by-field dictionary required for the translation can be obtained from the server node through a circuit of the local area network. However, both the machine translation dictionary generating apparatus (classified-by-field dictionary generating apparatus) 50 and the machine translation apparatus 60 can be provided in a server node. In this case, when a client node has to translate a pseudo code program, the information of the translation pseudo code program and the language to be translated is transmitted to the server node in which the pseudo code program is translated. Then, after the translation, the server node transmits the result through a circuit of the local area network to the client node which requested the translation.

The above described system configuration can be applied to a computer network where a plurality of terminals are connected to a host computer comprising general purpose computers, etc. That is, in such a system, a host computer acts as an above described server node, and the computer network can be a wide area, metropolitan (city area) or in-house network.

As explained above, according to the classified-by-field dictionary generating apparatus, it is possible to make a classified-by-field dictionary which can be used to translate the pseudo code program described in one language into the pseudo code program described in another language.

According to the machine translation apparatus 60, the pseudo code program described in one language can be automatically translated into the pseudo code program described in another language by using the above classified-by-field dictionary, and the process of translating the pseudo code program described in one language into the pseudo code program described in another language can be automatically executed for a plurality of languages (in a multilingual fashion).

In accordance with the machine translation system of claim 4, since the apparatus for making the classified-by-field dictionary and the apparatus for executing the machine translation are connected on the same network in which the machine translation apparatus receives the classified-by-field dictionary from the classified-by-field dictionary generating apparatus through the above network, the resource (classified-by-field dictionary) can be utilized effectively and many users can utilize the machine translation.

Furthermore, when the pseudo code program made in a certain country by the above apparatus is utilized in another country using another language, its maintenance can be facilitated and its development and maintenance can be smoothly performed in an internationally-distributed fashion.

What is claimed is:

1. A classified-by-field dictionary generating apparatus, comprising:
    notation data memory means for storing notation data, in which names are defined by at least two languages, which describes a design document used to produce a pseudo code program;
    extracting means supplied with the design document described by said notation data and extracting bilingual information necessary for translating a pseudo code program of a predetermined field described in a certain language into a pseudo code program described in another language on the basis of said notation data stored in said notation data memory means; and
    dictionary generating means for generating a classified-by-field dictionary corresponding to a field of a pseudo code program to be translated in which translation information on all notation data described in said design document is written in a predetermined format on the basis of said bilingual information extracted by said extracting means.

2. A machine translation apparatus comprising:
    a plurality of classified-by-field dictionaries, one being provided to each of a plurality of natural languages;

multilingual natural language dictionaries corresponding to said classified-by-field dictionaries;

dictionary selecting means for selecting said classified-by-field dictionary corresponding to the language expressing a translation pseudo code program and said natural language dictionary; and translating means for translating said translation pseudo code program described in a certain language into a pseudo code program described in another language with reference to said classified-by-field dictionary and said natural language dictionary selected by said dictionary selecting means.

3. A machine translation system comprising:

a classified-by-field dictionary generating apparatus comprising:

notation data memory means for storing notation data, in which names are defined by at least two languages, which describes a design document used to produce a pseudo code program;

extracting means supplied with the design document described by said notation data and extracting bilingual information necessary for translating a pseudo code program of a predetermined field described in a certain language into a pseudo code program described in another language on the basis of said notation data stored in said notation data memory means; and dictionary generating means for generating a classified-by-field dictionary corresponding to a field of a pseudo code program to be translated in which translation information on all notation data described in said design document is written in a predetermined format on the basis of said bilingual information extracted by said extracting means, and a machine translation apparatus comprising:

a classified-by-field dictionary generated by said classified-by-field dictionary generating apparatus and used to translate said notation data describing said design document for bilingual use, said classified-by-field dictionary being transmitted from said classified-by-field dictionary generating apparatus to said machine translation apparatus via a network;

a natural language dictionary for translating a natural language expressing a translation pseudo code program to be translated into another natural language; and translating means for translating said translation pseudo code program described in a certain language into a pseudo code program described in another language with reference to said classified-by-field dictionary and said natural language dictionary.

4. A machine translation system according to claim 3, wherein
said network is a local area network.

5. A machine translation system according to claim 4, wherein
said translating means translates said translation pseudo code program into a pseudo code program described in another specified language using said classified-by-field dictionary and said natural language dictionary.

6. A machine translation system according to claim 5, wherein
said classified-by-field dictionary generating apparatus is provided in a server node, and said machine translation apparatus is provided in a client node.

7. A machine translation system according to claim 4, wherein said classified-by-field dictionary generating apparatus and said machine translation apparatus are provided for a specific computer in the network, said specific computer receiving a translation pseudo program from another computer or terminal through a circuit of said network, converting said received translation pseudo code program to a pseudo code program in a language specified by said another computer or terminal, and transmitting the converted pseudo code program to said another computer or terminal through a circuit of said network.

8. A machine translation system according to claim 7, wherein
said specific computer is a server node.

9. A machine translation system according to claim 3, wherein
said network is a wide area network.

10. A machine translation system according to claim 9, wherein
said translating means translates said translation pseudo code program into a pseudo code program described in another specified language using said classified-by-field dictionary and said natural language dictionary.

11. A machine translation system according to claim 9,
wherein said classified-by-field dictionary generating apparatus and said machine translation apparatus are provided for a specific computer in the network, said specific computer receiving a translation pseudo program from another computer or terminal through a circuit of said network, converting said received translation pseudo code program to a pseudo code program in a language specified by said another computer or terminal, and transmitting the converted pseudo code program to said another computer or terminal through a circuit of said network.

12. A machine translation system according to claim 3, wherein
said network is a metropolitan area network.

13. A machine translation system according to claim 12, wherein
said translating means translates said translation pseudo code program into a pseudo code program described in another specified language using said classified-by-field dictionary and said natural language dictionary.

14. A machine translation system according to claim 12,
wherein said classified-by-field dictionary generating apparatus and said machine translation apparatus are provided for a specific computer in the network, said specific computer receiving a translation pseudo program form another computer or terminal through a circuit of said network, converting said received translation pseudo code program to a pseudo code program in a language specified by said another computer or terminal, and transmitting the converted pseudo code program to said another computer or terminal through a circuit of said network.

15. A machine translating system according to claim 3, wherein said network is an in-house network.

16. A machine translation system according to claim 15, wherein
said translating means translates said translation pseudo code program into a pseudo code program described in another specified language using said classified-by-field dictionary and said natural language dictionary.

17. A machine translation system according to claim 15,
wherein said classified-by-field dictionary generating apparatus and said machine translation apparatus are provided for a specific computer in the network, said specific computer receiving a translation pseudo program from another computer or terminal through a circuit of said network, converting said received translation pseudo code program to a pseudo code program in a language specified by said another computer or terminal, and transmitting the converted pseudo code program to said another computer or terminal through a circuit of said network.

18. A machine translation system according to claim 3, wherein
said translating means translates said translation pseudo code program into a pseudo code program described in another specified language using said classified-by-field dictionary and said natural language dictionary.

19. A machine translation system comprising:
a classified-by-field dictionary generating apparatus comprising:
notation data memory means for storing notation data, in which means are defined by at least two languages, which describes a design document used to produce a pseudo code program;
extracting means supplied with the design document described by said notation data and extracting bilingual information necessary for translating a pseudo code program of a predetermined field described in a certain language into a pseudo code program described in another language on the basis of said notation data stored in said notation data memory means; and
dictionary generating means for generating a classified-by-field dictionary corresponding to a field of a pseudo code program to be translated in which translation information on all notation data described in said design document is written in a predetermined format on the basis of said bilingual information extracted by said extracting means; and
transmitting means for transmitting said classified-by-field dictionary generated by said dictionary generating means; and
a machine translation apparatus comprising:
receiving means for receiving said transmitted classified-by-field dictionary from said classified-by-field dictionary generating apparatus, said classified-by-field dictionary being used to translate notation data described a design document for bilingual use;
a natural language dictionary for translating a natural language expressing a translation pseudo code program to be translated into another natural language; and
translating means for translating said translation pseudo code program described in a certain language into a pseudo code program described in another language based on said classified-by-field dictionary and said natural language dictionary.

20. A machine translation apparatus comprising:
a classified-by-field dictionary for providing bilingual information used to translate a first pseudo code program of a predetermined field described in a certain language into a second pseudo code program described in another language, said second pseudo code program being produced by referring to a design document, said design document being described by notation data in which means are defined by at least two languages, said bilingual information being extracted on the basis of said notation data;
a natural language dictionary for translating a natural language expressing a translation pseudo code program to be translated into another natural language; and
translating means for translating said translation pseudo code program described in a certain language into a pseudo code program described in another language based on said classified-by-field dictionary and said natural language dictionary.

* * * * *

UNITED STATES PATENT AND TRADEMARK OFFICE
CERTIFICATE OF CORRECTION

PATENT NO. : 5,323,311
DATED : June 21, 1994
INVENTOR(S) : Itaru Fukao et al.

It is certified that error appears in the above-indentified patent and that said Letters Patent is hereby corrected as shown below:

Claim 19, col. 14, line 14, "described" should be --describing--.

Signed and Sealed this

Thirtieth Day of August, 1994

Attest:

BRUCE LEHMAN

*Attesting Officer*   *Commissioner of Patents and Trademarks*